(12) United States Patent  (10) Patent No.: US 7,757,271 B2
Amdur et al.  (45) Date of Patent: Jul. 13, 2010

(54) COMPUTER SYSTEM SECURITY SERVICE

(75) Inventors: Eugene Amdur, Toronto (CA); Andrew Flint, Oakville (CA); Steven Lamb, Toronto (CA); Steve Kotsopoulos, Toronto (CA); Irving Reid, Toronto (CA); C. Harald Koch, Scarborough (CA); Andrzej Szyszkowski, Scarborough (CA); Laryn-Joe Fernandes, Ajax (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 200 days.

(21) Appl. No.: 12/014,612

(22) Filed: Jan. 15, 2008

(65) Prior Publication Data
US 2008/0134286 A1  Jun. 5, 2008

Related U.S. Application Data

(62) Division of application No. 09/552,345, filed on Apr. 19, 2000, now abandoned.

(51) Int. Cl.
G06F 21/20 (2006.01)
(52) U.S. Cl. .......................................................... 726/1
(58) Field of Classification Search ..................... 726/1, 726/2, 15
See application file for complete search history.

(56) References Cited

U.S. PATENT DOCUMENTS 5,987,611 A * 11/1999 Freund ........................... 726/4
6,141,686 A * 10/2000 Jackowski et al. .......... 709/224
6,484,261 B1 * 11/2002 Wiegel .......................... 726/11
6,487,665 B1 * 11/2002 Andrews et al. .............. 726/26
2002/0138459 A1 * 9/2002 Mandal et al. ................. 707/1

* cited by examiner

Primary Examiner—Ellen Tran

(57) ABSTRACT

A security service of computer networks having a policy builder, an LDAP-compliant database, a validator and an API. The policy builder component provides a graphical user interface to be used by a policy manager to define access policies for users seeking to access network services and resources. The graphical user interface has a grid of nodes representing access policies. The grid is arranged to correspond to a defined tree structure representing services and resources and a business relationship tree structure representing users. The graphical user interface permits the policy manager to define policy builder plug-ins for access policy customization. The LDAP-compliant database maintains the policy builder plug-ins. The validator component receives requests from users and queries the LDAP-compliant database to obtain relevant access policies as defined by the policy manager. The system provides for double inheritance of access policies such that where there is no express definition of an access policy for a node, the access policies are propagated according to the hierarchical structures of the data. The validator includes validator plug-ins for carrying out access policies corresponding to the access policies defined by policy builder plug-ins.

19 Claims, 10 Drawing Sheets

COMPUTER SYSTEM SECURITY SERVICE

This application is a divisional application of application Ser. No. 09/552,345, filed Apr. 19, 2000 now abandoned, entitled "Computer System Security System," which application is incorporated by reference herein as if reproduced in full below.

FIELD OF THE INVENTION

The present invention is directed to an improvement in computing systems and in particular to a security service for computer systems.

BACKGROUND OF THE INVENTION

As computer systems become more sophisticated and interconnected, and as they are increasingly integrated with other non-computer devices, there is a greater need to define a user's permitted access to particular services and resources.

For example, the growth of Internet-based distribution and e-commerce has spurred both large and small companies to seek new ways to share information with customers and trading partners. Computer systems designed to permit connectivity must also include security features to prevent access to the systems by users who are not authorized to have such access.

Prior art techniques available for securing computer networks include firewalls, and extranet security products (web specific security products).

Firewalls are hardware and software barriers that are installed between an internal network and the Internet. While firewalls provide networks with a tough external barrier, if used without other security measures, firewalls leave the network vulnerable once the firewall has been breached. In addition, firewalls typically do not provide a fine-grained level of security and therefore cannot provide different individual users with access to different sets of specific resources.

A solution to this problem of differential access is the implementation of extranets to provide fine-grained security for business-to-business relationships over the Internet. Extranets are designed to include differing security policies for partners, suppliers and customers. In theory, this should make the extranet solution more flexible than the traditional firewall.

However, extranets are typically limited by only providing security for Web server based resources on a network and are often only available to users accessing the network from the Internet. Since most networks contain more services or resources than just Web servers, it is advantageous to provide a solution to permit secure access to additional resources such as SQL databases, file archives and software archives by both internal and external users. Computers may also be used in conjunction with magnetic card readers and biometric readers to control access to such non-computer resources such as parking garages and photocopiers. In such a computer system, controlling access to non-computer resources is analogous to controlling access to resources that are provided within the computer system itself.

As computers are tied together using local and wide area networks, and over the Internet, the potentially large number of different services and resources available to a potentially large number of users, makes it difficult to provide for the simple definition and presentation of the access rules for those users, services and resources. Prior art systems permit the definition of security policies for given specific resources and services. Such systems do not, however, provide a simple mechanism for defining and reviewing the security policies. In such prior art systems, the security policies for resources in the system are defined on a one-by-one basis. Such an approach becomes cumbersome and inefficient when setting the security policies for large numbers of users, services or resources.

It is therefore desirable to have a security service for a wide variety of resources and services available on a defined computer network and that will include the necessary scalability and flexibility to support different network configurations, resources, and security requirements. It is desirable to have a security service permitting the access rules for the different users, resources, and services to be clearly shown and simply defined and to be modified by the use of an appropriate user interface.

SUMMARY OF THE INVENTION

According to one aspect of the present invention, there is provided a computer system to provide network security.

According to another aspect of the present invention, there is provided a computer security service for a computer network accessible by users and including services and resources, the computer security service including, a policy builder component, including a network constituent definition component, for defining user data and services and resources data corresponding to the computer network users, services and resources, and a policy definition component for defining access policies for the computer network users, services and resources, a database component for maintaining user, services and resources data, and access policies, and for providing a set of selected access policies in response to a database query, and a validator component, including a request parser for receiving a policy query for service or resource access originated by a network user and for generating a corresponding database query for submission to the database component, and a policy parser for receiving the set of access policies provided by the database component in response to the corresponding database query and for generating a policy decision for communication to the network user based on the set of access policies provided by the database component.

According to another aspect of the present invention, there is provided the above computer security service further including an API component for receiving an access request for service or resource access originated by a network user and for passing a corresponding policy query to the validator component, the API component further receiving the policy decision from the validator and accordingly permitting or denying access to the network user.

According to another aspect of the present invention, there is provided the above computer security service in which the database component maintains the user, services and resources data, and the access policies in an LDAP compliant format According to another aspect of the present invention, there is provided the above computer security service in which the policy definition component includes a policy definition plug-in integration component for registering one or more policy definition plug-in components for use in defining the access policies.

According to another aspect of the present invention, there is provided the above computer security service in which the validator component includes a decision node plug-in integration component for registering one or more decision node plug-in components for use in implementing access policies referencing policy definition plug-in components.

According to another aspect of the present invention, there is provided the above computer security service further including an authenticator component that includes an authenticator plug-in integration component for registering plug-ins used in the authentication of the network user, and in which the authenticator component includes a non-interactive authentication component for the authentication of one or more network users without requiring the one or more network users to interact with the security service.

According to another aspect of the present invention, there is provided the above computer security service further including a desktop component for installation on the computer of a network user for use in the authentication of the user.

According to another aspect of the present invention, there is provided the above computer security service in which the policy builder component includes a graphical user interface for displaying a grid having nodes, laid out on a first and on a second axis, user labels corresponding to the user data, each user label labelling nodes aligned relative to the first axis of the grid, and resource labels corresponding to the services and resources data, each resource label labelling nodes aligned relative to the second axis of the grid, the nodes in the grid corresponding to the access policies for users and services and resources, as defined by the user and resource labels.

According to another aspect of the present invention, there is provided the above computer security service in which the grid includes a defined set of nodes, aligned relative to the first axis of the grid, each of the defined set of nodes representing the non-interactive authentication characteristic for a unique one of the defined services and resources displayed in the grid.

According to another aspect of the present invention, there is provided the above computer security service in which the grid includes a defined set of nodes, aligned relative to the first axis of the grid, each of the defined set of nodes representing the access policy for an unknown user for a unique one of the defined services and resources displayed in the grid.

According to another aspect of the present invention, there is provided the above computer security service further including an access policy editor for defining the nodes in the grid, the access policy editor including means for graphically assembling icons representing policy rules to define an access policy for a user-specified node.

According to another aspect of the present invention, there is provided the above computer security service further including a resource discovery component to poll the computer network and to generate a resource tree data structure corresponding to resources in the computer network, including a resource discovery plug-in specification component to specify resource discovery plug-in components for carrying out the process of discovery of the resources for a defined service in the network.

According to another aspect of the present invention, there is provided the above computer security service further including a user discovery component to poll the computer network and to generate a business relationship tree data structure corresponding to users defined for the computer network.

According to another aspect of the present invention, there is provided the above computer security service further including means to provide for inheritance of access policies by propagating access policies for network users, services and resources, based on a hierarchical ordering of the user data, and a hierarchical ordering of the services and resources data.

According to another aspect of the present invention, there is provided the above computer security service in which the services and resources data is maintained in a resource tree data structure, the resource tree data structure including a network entry and label, service and resource entries and in which each entry in the resource tree data structure is permitted to have children entries and in which the data structure is defined such that the network entry is restricted to be the root entry of the data structure, the children of label entries are constrained to be label entries and service entries, the children of service entries are constrained to be resource entries, and the children of resource entries are constrained to be resource entries.

According to another aspect of the present invention, there is provided a graphical user interface for a security service for a computer network, the computer network including defined users, services and resources, the graphical user interface displaying a grid including nodes laid out on a first and on a second axis, user labels corresponding to defined users, each user label labeling nodes aligned relative to the first axis of the grid, resource labels corresponding to the defined services and resources, each resource label labeling nodes aligned relative to the second axis of the grid, and the nodes in the grid corresponding to access policies for the defined users and defined services and resources for the computer network, corresponding to the user and resource labels.

According to another aspect of the present invention, there is provided the above graphical user interface, the grid including inheriting nodes and defining nodes, the defining nodes corresponding to access policies expressly defined by a policy manager, the graphical user interface further including means for displaying inherited access policies for inheriting nodes in the grid by propagating access policies from the defining nodes in the grid across the inheriting nodes below the defining nodes in each of the business relationship tree data structure and the resource tree data structure.

According to another aspect of the present invention, there is provided a policy builder for a security service of a computer network accessible by users and including services and resources, the policy builder including, a network constituent definition component, for defining user data and services and resources data corresponding to the computer network users, services and resources, and a policy definition component for defining access policies for the computer network users, services and resources, the policy definition component including, a plug-in integration component to permit a policy manager to register one or more plug-in components for use in defining manager-defined access policies, a defined access rule component for providing a set of pre-defined access rules to a policy manager for use in creating access policies.

According to another aspect of the present invention, there is provided the above policy builder further including an access policy editor for defining the access policies, the access policy editor including means for graphically assembling icons representing the pre-defined access rules and manager-defined access policies.

According to another aspect of the present invention, there is provided an authentication component for a security service of a computer network, the authentication component including, a plug-in integration component to permit a policy manager to register one or more plug-in components for use in defining authentication for users of the network and a defined authentication component for providing a set of pre-defined authentication methods for use in creating authentication policies.

According to another aspect of the present invention, there is provided an LDAP server, the LDAP server being operatively connectable with a computer network including a set of resources and services, the LDAP server further including a network information component for generating, maintaining and providing retrieval from, a tree data structure having nodes corresponding to one or more of the members of the set of resources and services in the computer network.

According to another aspect of the present invention, there is provided an access policy definition component for a computer network security system, including a rule specification component for defining access policies for hierarchically defined sets of users and for hierarchically defined portions of a computer network, the security policy definition component providing for the propagation of defined security policies for a specified set of users and a specified portion of the computer network, to those sets of users and those portions of the computer network which are located under the specified set of users and under the portion of the computer network, in the respective hierarchies.

According to another aspect of the present invention, there is provided an access policy definition component for a computer network security system including a policy builder component for generating an XML format representation of an access policy from input from a policy manager, the access policy component storing data corresponding to the XML format representation of the security policy, the access policy component accepting XML format queries relating to defined access policies and generating responses based on the stored data corresponding to defined access policies.

According to another aspect of the present invention, there is provided a validator component and a desktop component for a computer network security system, the desktop component for installation on computers in a computer network utilized by network users, and including a desktop authentication component for carrying out authentication of network users in the computer network security system, the validator component including a validator authentication component for the authentication of the network users, the validator authentication component selectively communicating with the desktop component to carry out authentication of network users, the authentication being granted on a time-limited basis.

According to another aspect of the present invention, there is provided a validator component for a computer network security system, including a request parser for accepting policy queries in XML format from a user of a computer network, the validator component generating a corresponding database query to a policy database storing a set of access policies for the network, the validator component further including a policy parser for accepting XML format access policy definitions and generating a policy definition in XML format to the user, the validator further including a plug-in launcher for initiating execution of plug-ins specified in the XML format access policy definitions.

According to another aspect of the present invention, there is provided a computer program product for use with a computer network, the computer program product including a computer usable medium having computer readable program code means embodied in said medium for implementing the above computer security service.

According to another aspect of the present invention, there is provided a computer program product for use with a security service for a computer network, the computer program product including a computer usable medium having computer readable program code means embodied in said medium for implementing the above graphical user interface.

According to another aspect of the present invention, there is provided a computer program product for use with a security service for a computer network, the computer program product including a computer usable medium having computer readable program code means embodied in said medium for implementing the above policy builder.

According to another aspect of the present invention, there is provided a computer program product for use with a security service for a computer network, the computer program product including a computer usable medium having computer readable program code means embodied in said medium for implementing the above authentication component.

According to another aspect of the present invention, there is provided a computer program product for use with a security service for a computer network, the computer program product including a computer usable medium having computer readable program code means embodied in said medium for implementing the above LDAP server.

According to another aspect of the present invention, there is provided a computer program product for use with a security service for a computer network, the computer program product including a computer usable medium having computer readable program code means embodied in said medium for implementing an access policy component including a policy builder component for generating an XML format representation of an access policy from input from a policy manager, the access policy component storing data corresponding to the XML format representation of the security policy, the access policy component accepting XML format queries relating to defined access policies and generating responses based on the stored data corresponding to defined access policies.

According to another aspect of the present invention, there is provided a computer program product for use with a security service for a computer network, said computer program product including a computer usable medium having computer readable program code means embodied in the medium for implementing a validator component and a desktop component, the desktop component for installation on computers in a computer network utilized by network users, and including a desktop authentication component for carrying out authentication of network users in the computer network security system, the validator component including a validator authentication component for the authentication of the network users, the validator authentication component selectively communicating with the desktop component to carry out authentication of network users, the authentication being granted on a time-limited basis.

According to another aspect of the present invention, there is provided a computer program product for use with a security service for a computer network, the computer program product including a computer usable medium having computer readable program code means embodied in said medium for implementing a validator component including a request parser for accepting policy queries in XML format from a user of a computer network, the validator component generating a corresponding database query to a policy database storing a set of access policies for the network, the validator component further including a policy parser for accepting XML format access policy definitions and generating a policy definition in XML format to the user.

According to another aspect of the present invention, there is provided a method for providing computer network security, the network being accessible by users and including services and resources, the method including the steps of:

using a policy builder to define user data and services and resources data corresponding to the computer network users, services and resources, and to define access policies for the computer network users, services and resources, maintaining user, services and resources data, and access policies, in a database, providing a set of selected access policies in response to a database query, receiving, in a validator, a policy query for service or resource access originated by a network user and generating a corresponding database query for submission to the database component, and receiving, in a validator, the set of access policies provided by the database component in response to the corresponding database query and generating a policy decision for communication to the network user based on the set of access policies provided by the database component.

According to another aspect of the present invention, there is provided a the above method further including the steps of:

displaying, on a computer display unit, a grid having nodes, laid out on a first and on a second axis, displaying, on the grid, unit user labels corresponding to the user data, each user label labelling nodes aligned relative to the first axis of the grid, and displaying on the grid, resource labels corresponding to the services and resources data, each resource label labelling nodes aligned relative to the second axis of the grid, whereby the nodes in the grid correspond to the access policies for users and services and resources, as defined by the user and resource labels.

According to another aspect of the present invention, there is provided a program storage device readable by a machine, tangibly embodying a program of instructions executable by the machine to perform the above method steps.

According to another aspect of the present invention, there is provided a computer system to provide security for a network accessible by users and including services and resources, the computer system including, a policy builder including a network constituent definition component, for defining user data and services and resources data corresponding to the computer network users, services and resources, and a policy definition component for defining access policies for the computer network users, services and resources, including a policy definition plug-in integration component for registering one or more policy definition plug-in components for use in defining the access policies, a database for maintaining user, services and resources data, and access policies, in an LDAP compliant format, and for providing a set of selected access policies in response to a database query, a validator, including a request parser for receiving a policy query for service or resource access originated by a network user and for generating a corresponding database query for submission to the database, a policy parser for receiving the set of access policies provided by the database in response to the corresponding database query and for generating a policy decision for communication to the network user based on the set of access policies provided by the database, a decision node plug-in integration component for registering one or more decision node plug-in components for use in implementing access policies referencing policy definition plug-in components, and an API component for receiving an access request for service or resource access originated by a network user and for passing a corresponding policy query to the validator, the API component further receiving the policy decision from the validator and accordingly permitting or denying access to the network user.

Advantages of the present invention include a security service for different resources available on a given network and that includes the necessary flexibility to support different network configurations and security requirements. Further, the security service of the preferred embodiment provides for controlled access to different system, network, and corporate resources such as web servers, FTP servers, and services that make available information and communication signals such as audio and television broadcasts.

BRIEF DESCRIPTION OF THE DRAWINGS

The preferred embodiment of the invention is shown in the drawings, wherein.

Figure 1:
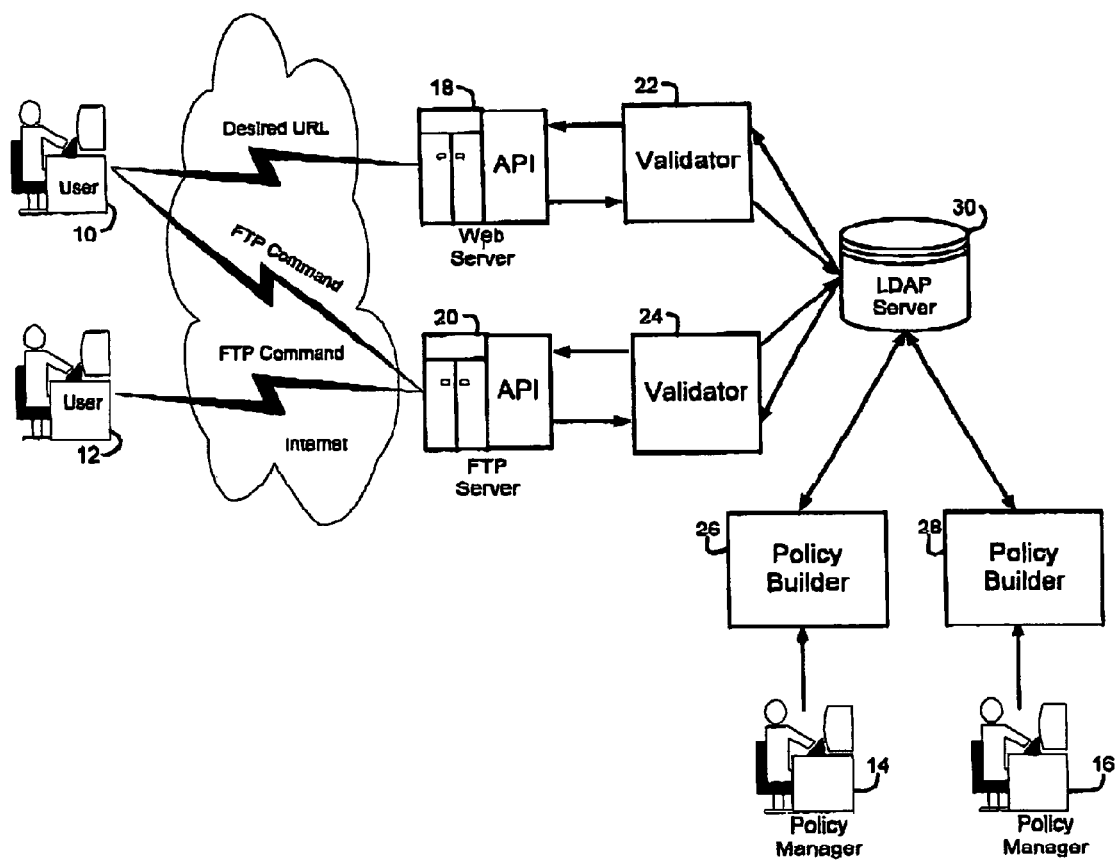
FIG. 1 is a schematic diagram illustrating a first example system implementing the security service of the preferred embodiment.

In the drawings, the preferred embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The security service of the preferred embodiment is designed to provide and control access to resources and computer services. In the preferred embodiment, examples of resources include both computer resources and resources which are access-controlled by computer systems. In the latter category are things such as parking garages, meeting rooms, photocopiers, cash registers and other physical devices which have controlled access and for which control is carried out using a computer. In the preferred embodiment, the terms network resources or computer resources will be used to refer to both types of resources. Examples of computer resources that are securable are relational tables of data, accounting spreadsheets, individual HTML pages, and streams of data making up television programs. In the preferred embodiment, computer services are applications, or sets of applications, running on a computer or a set of computers that are able to provide resources to users. To implement the security service of the preferred embodiment the Java language and the C++ language are used. The security service is implemented as an object-oriented computer system and includes certain pre-defined security features. In addition, the use of an object-oriented framework to implement the preferred embodiment permits policy managers to extend the framework to support other custom or third party defined security features.

The security service of the preferred embodiment provides for:
1. the authentication of users of a computer network,
2. the management of user access to services and resources of the computer network based on a set of access policies, and
3. the definition of the authentication mechanisms and access policies for the computer network.

Each of these aspects of the preferred embodiment is described in further detail, with reference to the drawings.

In the description of the preferred embodiment, reference is made to "access" to services and resources. "Access" as used in the description of the preferred embodiment includes "authorization" as the term is sometimes used in the art. In some prior art contexts, "access" is used where a service is made available, and "authorization" is used where resources are provided by the service. In the security service of the preferred embodiment, there is no necessary distinction between the two concepts and the term "access" will be used. Similarly, the description of the preferred embodiment makes reference to access policies in a security service. In the prior art, a distinction is sometimes drawn between security access and policy access. The former being associated with the confidentiality of data being accessed, and the later being associated with the manner in which the data is able to be accessed (for example, a high or low speed connection to a database). Using the system of the preferred embodiment, both types of policy may be defined by a policy manager and the description of the preferred embodiment therefore uses access policies as a general term that includes quality of service policies and the like and policies that are based on confidentiality restrictions.

Turning to the figures, FIG. 1 is a schematic diagram showing an example security service. FIG. 1 shows users 10, 12, who potentially seek access to network resources. FIG. 1 also shows policy managers 14, 16 who are able to define which users are granted access to which resources in the network. The example system shown in FIG. 1 includes web server 18 and FTP server 20. Components of the example security service of FIG. 1 include validators 22, 24 and policy builders 26, 28, as well as LDAP server 30.

Figure 2:
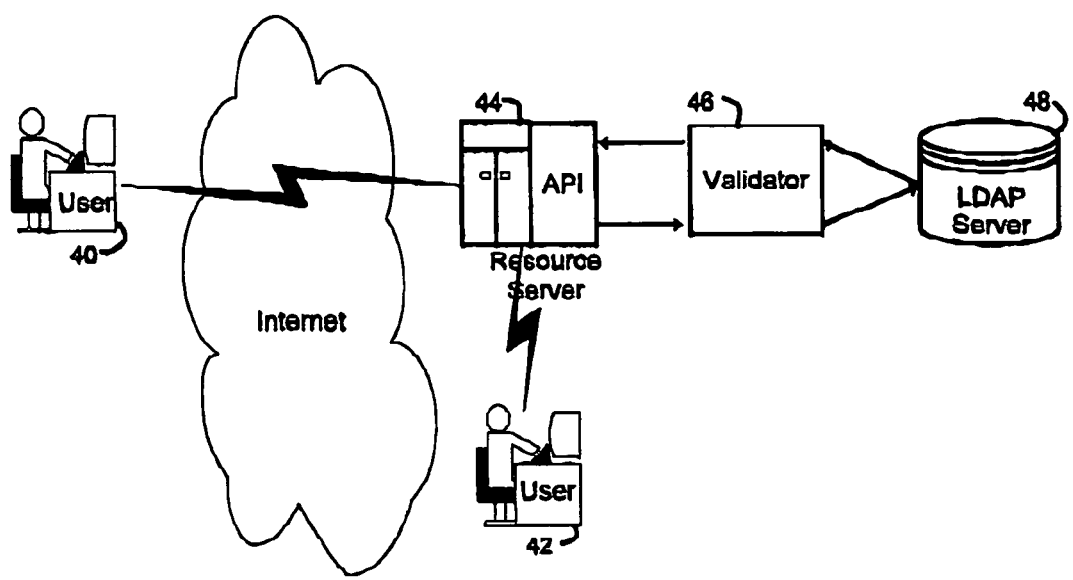
FIG. 2 is a schematic diagram illustrating a second example system implementing the security service of the preferred embodiment.

FIG. 2 is a schematic diagram showing an example security service in which the API of the preferred embodiment is resident on a resource server. FIG. 2 shows users 40, 42, resource server 44, validator 46 and LDAP server 48. In FIG. 2, user 40 is shown accessing resource server 44 by way of the Internet, while user 42 accesses resource server 44 directly. The configuration of FIG. 2 is said to be a fully integrated as the API for the security service is resident on resource server 44. Where possible, the API of the preferred embodiment will be resident as a plug-in, for example, on a web server. In other cases, for example an FTP server, plug-ins are not executable and the server source code itself is modified to support the API of the preferred embodiment.

Figure 3:
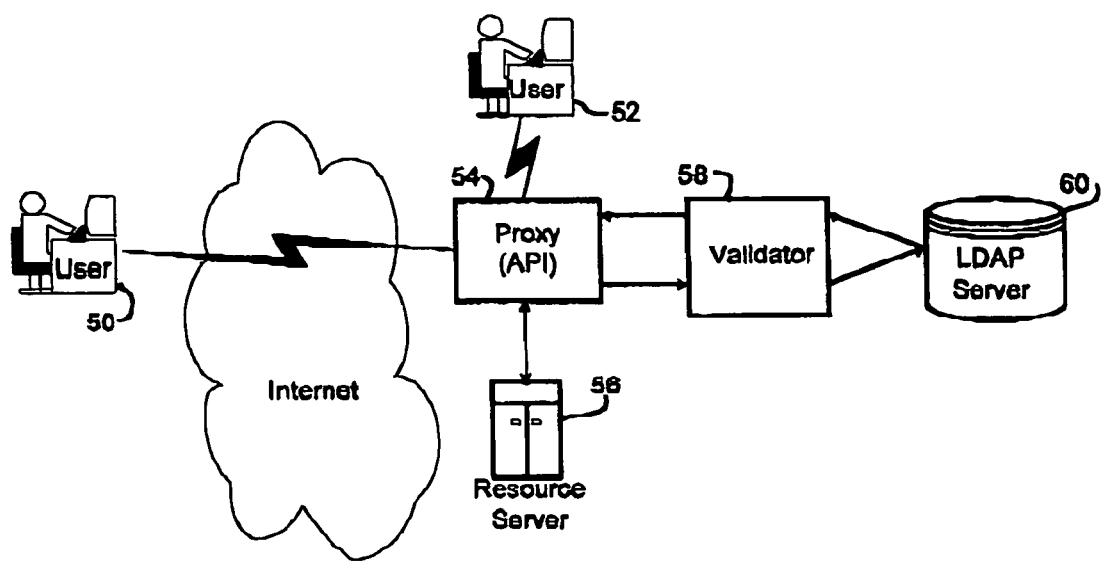
FIG. 3 is a schematic diagram illustrating a third example system implementing the security service of the preferred embodiment.

FIG. 3 is a schematic diagram showing an example system employing the security service of the preferred embodiment in which the API of the preferred embodiment is resident on a proxy server. FIG. 3 shows users 50, 52, proxy server 54, resource server 56, validator 58 and LDAP server 60. In FIG. 3, users 50, 52 access resource server 56 by way of proxy server 54. User 50 is shown accessing resource server 56 by way of the Internet and proxy server 54, while user 52 accesses resource server 56 by a direct connection with proxy server 54.

Figure 4:
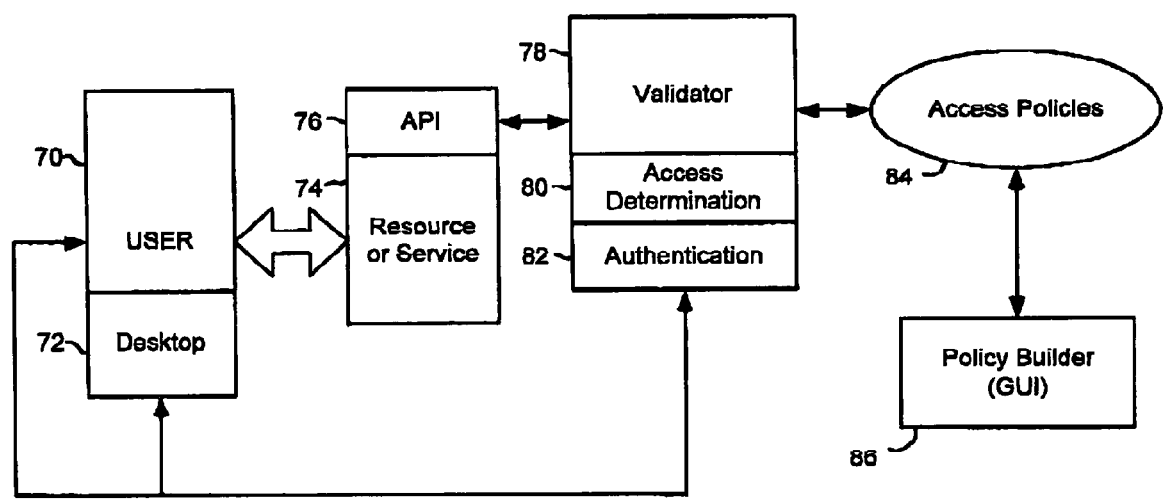
FIG. 4 is a schematic diagram illustrating the architecture of the security service of the preferred embodiment.

FIG. 4 is a schematic diagram illustrating the system architecture of the security service preferred embodiment. A user computer is represented as user 70, including desktop client application 72. Resource or service 74 may be accessed by user 70. Resource 70 uses API 76 to call validator 78, which includes an access determination component 80 and authentication component 82. Access policies 84 shown in the diagram of FIG. 4 represent the security service policy definitions defined by the policy manager using policy builder 86.

In FIG. 4, user 70 is shown seeking access to service or resource 74. API 76 receives the request for access from resource 74 and, in turn, calls validator 78. Validator 78 returns information to API 76 that results in user 70 being granted access to resource or service 74, or not.

Validator 78 may make use of one or more authentication servers, represented in FIG. 4 by authentication component 82. Authentication may occur by interrogating the user directly or by reference to desktop application 72, running on the computer of user 70, or a combination. Validator 78 also carries out retrieval from access policies 84 and potentially uses access determination component 80 to determine how the retrieved access policies control the access sought by user 70. Access policies 84 are defined by use of policy builder 86, which includes the GUI for presenting the definition functionality to the policy manager.

API 76 shown in FIG. 4 is the "thin" implementation of the application programming interface component. In this implementation, validator 78 is shown as a separate component in the security service. An alternative implementation includes the functionality provided by validator 78 as part of API 76. In such an implementation, API 76 may include the components shown in FIG. 4 as validator 78, access determination component 80 and authentication component 82. This alternative implementation is referred to as a "thick" or "fat" API model. The description of the preferred embodiment makes reference to the thin API implementation but it will be apparent to those skilled in the art that the thick API model will provide the same functionality and may be implemented in a manner similar to the thin API implementation, with the necessary modifications.

As will be appreciated from the detailed description below, the access determination component 80 and the authentication component 82 may be implemented as plug-ins and desktop 72 may be implemented to accept plug-ins for authentication. System policy managers are able to define additional plug-ins to permit the framework implementing the security service to be customized to meet particular security requirements for a given computer network.

The authentication of a user may occur as a preliminary step carried out by desktop 72, as a step initiated by validator 78 using authentication component 82 prior to applying access policies 84, or as a step defined in one of access policies 84.

Validator 78 interprets one or more of access policies 84 and calls access determination component 80 or authentication component 82 to carry out the steps of required to authenticate user 70 and to control access to resource or service 74. As will be apparent from the architecture as shown in FIG. 4, a security service implemented using the object oriented system of the preferred embodiment will permit access to be determined for a variety of resources and services.

The security service of the preferred embodiment stores authentication and access policy information about services and resources for the users of the network. The preferred embodiment implementation of the security service of the invention uses the LDAP protocol (Lightweight Directory Access Protocol) to store this data. Because the LDAP protocol is widely adopted, a significant amount of data relating to computer and network users is accessible by operating systems and application programs via the protocol. Using the existing LDAP protocol permits the security service of the preferred embodiment to be ported from one environment to another and permits the security service to work across multiple operating systems at the same time. As is described below, the preferred embodiment extends an LDAP directory to include other data, including plug-in code that is available to be utilized in the security service of the preferred embodiment to provide security for resources and services.

In the preferred embodiment, certain data used by the security service (defined in more detail below) is maintained in one or more LDAP directories managed by one or more LDAP servers. The preferred embodiment provides a graphical user interface (GUI) to display certain of the data maintained by the LDAP server. In the example shown in FIG. 1, policy builders 26, 28 make the GUI available to policy managers 14, 16 respectively. In the example policy builders 26, 28 store and retrieve data from LDAP server 30 and manipulate and present data using the GUI of the preferred embodiment. Because data is made available by LDAP server 30 according to the LDAP protocol, policy managers 14, 16 may access the data by a standard LDAP browser, as an alternative to using the GUI of policy builders 26, 28. Policy managers 14, 16 in FIG. 1 create and modify security policies for a defined system or network using policy builders 26, 28. It will be apparent to those skilled in the art that in an alternative implementation of the security system of the invention, the data stored in LDAP server 30 may be maintained in other, non-LDAP compliant formats. The preferred embodiment makes use of the LDAP protocol to exploit existing LDAP directories created for particular computer systems, and to provide a well-defined and uniform interface to the data. In the example system used to illustrate the preferred embodiment, LDAP server 30 is a component of the computer system described. Although the description of the preferred embodiment refers to an LDAP server, it will be apparent to those skilled in the art that an LDAP meta-directory server will also meet the requirements of the preferred embodiment. A meta-directory server in this context is a server that potentially maps user data from different sources, both LDAP-compliant and non-LDAP, to generate a single object describing the users of the network. It will be apparent to those skilled in the art that the creation and maintenance of data in an LDAP-compliant form may be accomplished by different implementations. The different implementations are transparent to the security service due to the nature of the LDAP protocol. The data may be found on a single server or on multiple servers and may have components which are LDAP and other non-LDAP components, but the security service will see the data as a single LDAP directory.

For the policy manager to define access policies and authentication methods, the policy manager must first define the services, resources and users subject to the access and authentication rules for a specified network. This network may be limited to a single CPU or may be specified to include different computer systems that may or may not interact with each other. Once the resources and services for the defined network are determined, a resource tree data structure is built by the policy builder component. As will be apparent from the description, the resource tree data structure is implemented in the LDAP server to include access rules for the defined network as a whole, and for services and resources available in the network.

The system of the preferred embodiment uses the LDAP protocol, version 3, to store information about network resources in the resource tree data structure. The resource tree data structure is combined with standard LDAP user configuration information in a directory server (shown as LDAP server 30, in FIG. 1). The data in LDAP server 30 is used to define all existing network users in the policy configuration as defined by policy managers 14, 16. Policy builders 26, 28 provide the user interface and functionality to permit policy managers 14, 16, respectively, to define security policies for the network and data resources in the given resource tree. These policies are defined in XML format documents, which are used to build directory server LDAP data.

Turning to the example of FIG. 1, once LDAP server 30 has definitions of access policies from policy builders 26, 28, validators 22, 24 are able to submit LDAP queries to LDAP server 30. Validators 22, 24 receive policy query objects from APIs found on web server 18 and FTP server 20, in the example shown in FIG. 1. The APIs for the preferred embodiment as shown in FIG. 1 are resident on network service and resource servers. The APIs translate requests for resources from users into policy query objects that are communicated from the API to validators 22, 24. Validators 22, 24 use the policy query objects to retrieve policy definition objects from LDAP server 30, for specific users accessing a defined resource. Validators 22, 24 evaluate the policy definition objects retrieved from LDAP server 30. Based on the evaluation, the validator returns a response to the appropriate resource server. The response may be one of "allow", "deny", a request for more data, an error, or a user-defined response that is used by the resource server to provide the appropriate security access. The resource server acts on the response from the validator, typically by continuing with the connection or action, or by returning "permission denied" to the user. In the security service of the preferred embodiment, both the policy query and policy definition objects are expressed using XML (Extensible Markup Language). Validators 22, 24 act by parsing the XML of the returned policy definition object. The XML policy definition objects may reference plug-in code that will carry out access determination and authentication functions. As the above discussion indicates, validators 22, 24 act as XML-based parsers and may be implemented in a relatively straightforward manner.

In the preferred embodiment, validators 22, 24 include a caching mechanism to provide for an alternative to directly accessing LDAP server 30. The submission of LDAP queries to directory 30 is replaced by accessing the cache, for popular or recently requested resources or services.

FIG. 1 shows the architecture of an example system where the APIs are resident directly on web server 18 and FTP server 20. FIG. 2 illustrates a simple configuration of an example integral system. User 40 and user 42 access resource server 44 via the Internet and local network, respectively. Resource server 44 submits policy queries to validator 46, LDAP server 48 accepts queries from validator 46 and replies with XML responses. Validator 46 then passes policy decisions to resource server 44 to permit or deny access to resources on resource server 44 for users 40, 42.

To permit the security service of the preferred embodiment to accept legacy resources, the system may utilize a proxy server, as is shown in the example configuration of FIG. 3. In this case, users 50, 52 do not access resource server 56 directly, but rather through proxy server 54. The API is resident on proxy server 54 and the communications from API on proxy server 54 to LDAP server 60 are similar to those described above with reference to FIG. 2. Validator 58 sends queries to LDAP server 60 and accepts and processes the XML responses from LDAP server 60.

In the example of FIG. 3, where one of users 50, 52 is granted access to the resource being requested, proxy server 54 passes the connection to resource server 56 to the appropriate user. In this way, resource servers that are not capable of hosting the API of the preferred embodiment may still be included in the security service of the preferred embodiment.

Turning to the definition of authentication mechanisms and the definition of access and authorization policies in more detail, the security service of the preferred embodiment provides for the following definitions:

1. Definition of a resource tree data structure for the network or networks to be subject to access control.
2. Definition of a business relationship tree data structure.
3. Definition of access rules governing access to services and resources by users.
4. Definition of authentication rules.
5. Definition of non-interactive authentication conditions.
6. Definition of unknown user conditions.

Figure 5:
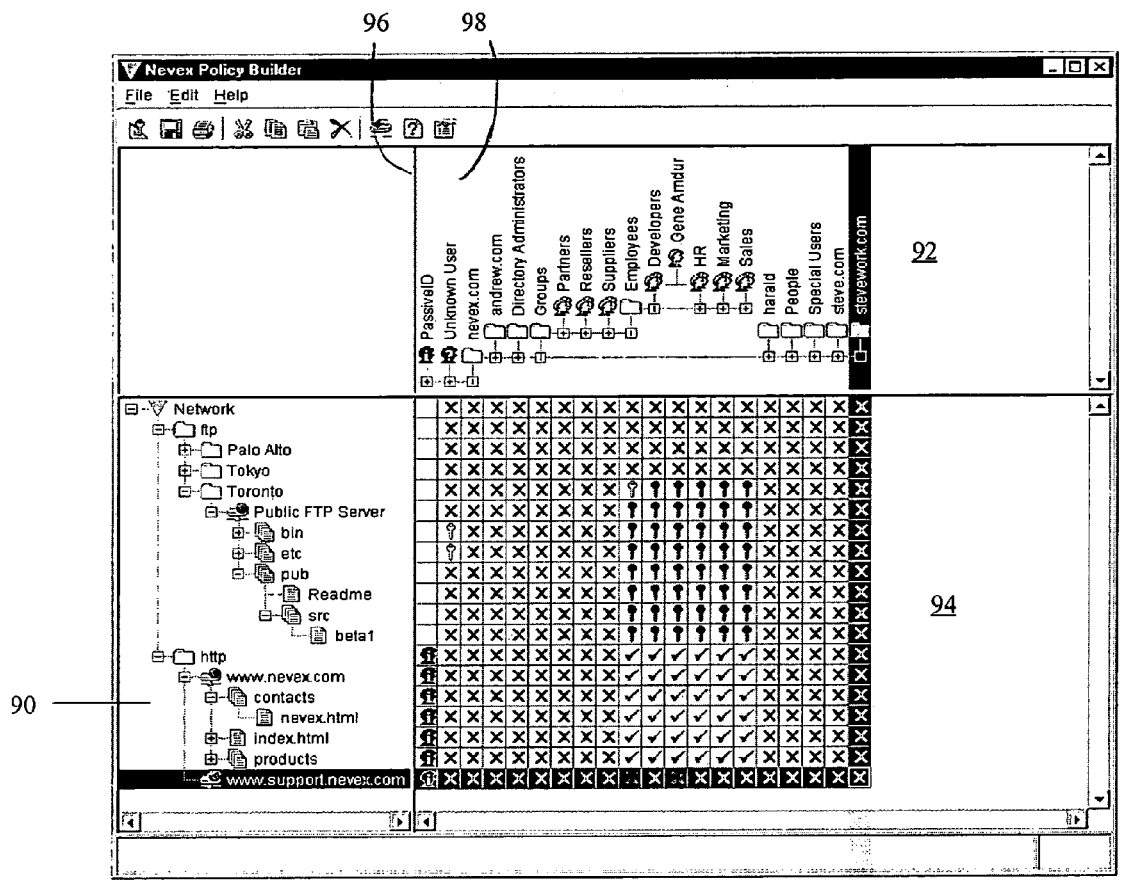
FIG. 5 is a representation of a screen shot showing the graphical user interface of the policy builder of the preferred embodiment.

The security service of the preferred embodiment permits a policy manager to specify most of the above definitions from a single GUI provided by the policy builder component as exemplified by policy builder 26, 28 in FIG. 1. An example of the display used in such an interface is provided in the screenshot of FIG. 5. The example of FIG. 5 shows a representation of the resource tree displayed on the leftmost portion 90 of the window pane shown in FIG. 5 (the row labels for the grid shown in the screen shot of FIG. 5). The business relationship tree is shown as the column labels in the upper portion 92 of the window pane, for the grid displayed in FIG. 5 (excluding the two leftmost columns in the grid). The nodes in the grid shown in central portion 94 themselves represent access rules (potentially including authentication rules). The non-interactive authentication and the unknown user conditions are specified by respective columns 96, 98 in FIG. 5.

In the preferred embodiment, the resource tree data structure and the business relationship tree data structure together define the constituent elements of the network (the network constituents). In the preferred embodiment, these two tree data structures are implemented as subsets of the LDAP directory maintained by the LDAP server (LDAP server 30 in FIG. 1). The same is true for other data reflecting the rules and conditions set out above. Although the preferred embodiment utilizes an LDAP server to store this data, in alternative implementations, other database management systems may be used to maintain and make available the data. The policy builder component of the security service of the preferred embodiment defines how different types of data may be added to the database implemented, in the preferred embodiment implementation, by the LDAP server.

Figure 6:
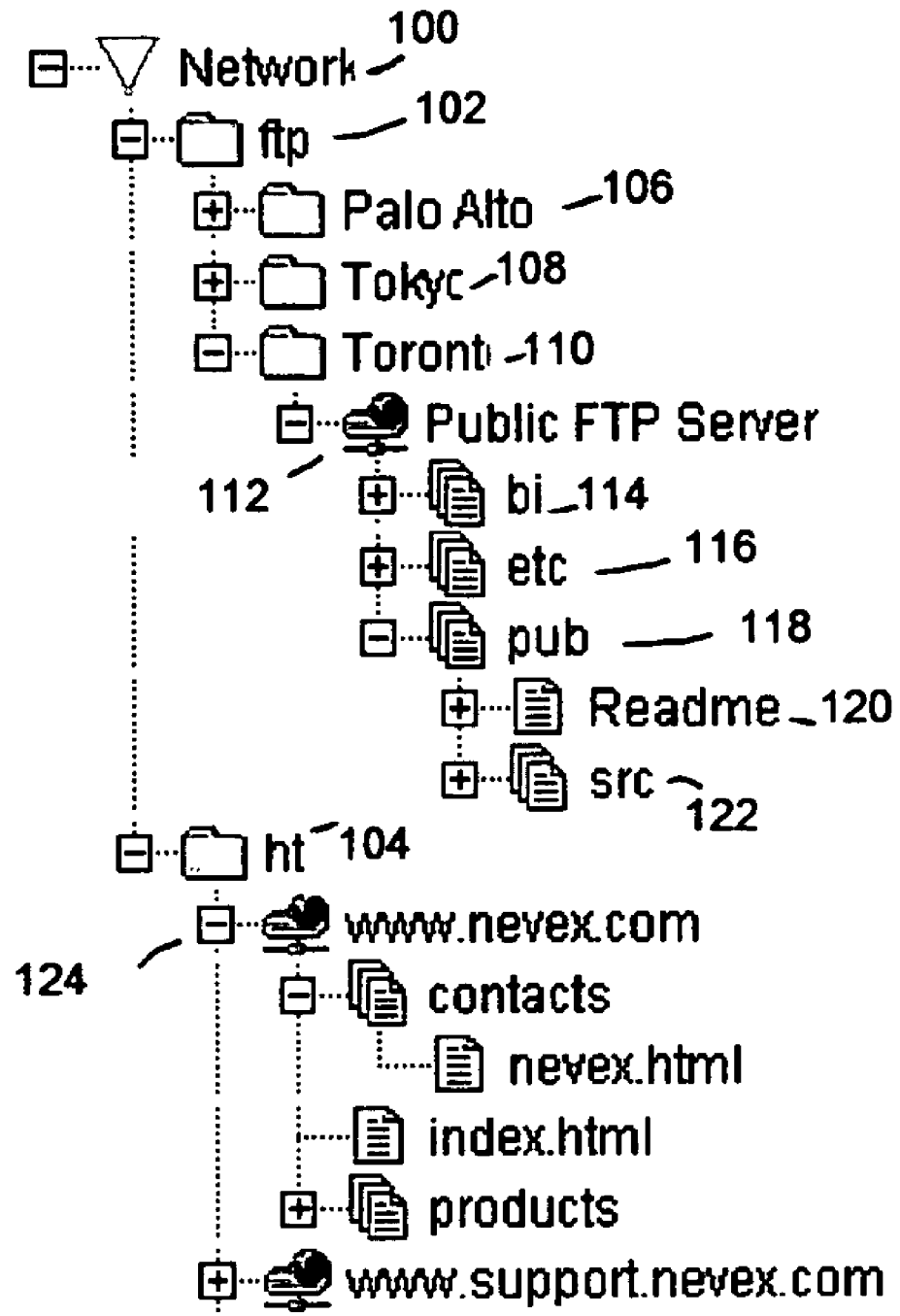
FIG. 6 is a representation of an example resource tree as displayed by the preferred embodiment.

In the preferred embodiment, a structure is imposed on the resource tree. An example display of a resource tree data structure is shown in FIG. 6.

The resource tree is made up of labels (which are shown as folders in FIG. 6), service entries and resource entries. At the top level of the example resource tree of FIG. 6 is the Network label 100. This label represents the entire network for which the policy manager will define security access policies. Under the Network label 100 in the example of FIG. 6 are "Folder" labels that are used to group like services together. In FIG. 6, there are "ftp" folder 102 and "http" folder 104, representing groupings of those two different types of services that the network offers respectively. Under "ftp" folder 102 there are folders for grouping ftp resources by city. In the example of FIG. 6 these are "Palo Alto" folder 106, "Tokyo" folder 108, and "Toronto" folder 110. In the preferred embodiment, folders in the resource tree may be nested to any desired depth.

As indicated above, the resource tree represents services and resources. In the preferred embodiment, the policy builder constrains the resource tree structure such that each resource entry must be associated with a service entry located above the resource entry in the tree. For example, in FIG. 6, the "Public FTP Server" service entry 112 is shown having resource "bin", "etc", "pub", "Readme", "src" entries 114, 116, 118, 120, 122, respectively. Each of these resource entries is located under the Public FTP Server entry 112 in the hierarchy of the resource tree data structure and is displayed appropriately by the GUI of the preferred embodiment.

The resource tree data structure of the preferred embodiment constrains the root entry of the tree to be a network entry. The network node may have any number of label entry and service entry children. Each label entry may have any number of label entry and service entry children. Each service entry is constrained to have (any number of) resource entry children. Each resource entry may have any number or resource entry children, but all children must be resource entry children.

In the preferred embodiment, service entries have data associated with them: a list of protocols and/or hosts and port numbers for the protocol (where appropriate) that pertain to each service. For a given service entry, there can be multiple hosts, protocols and ports.

Figure 7:
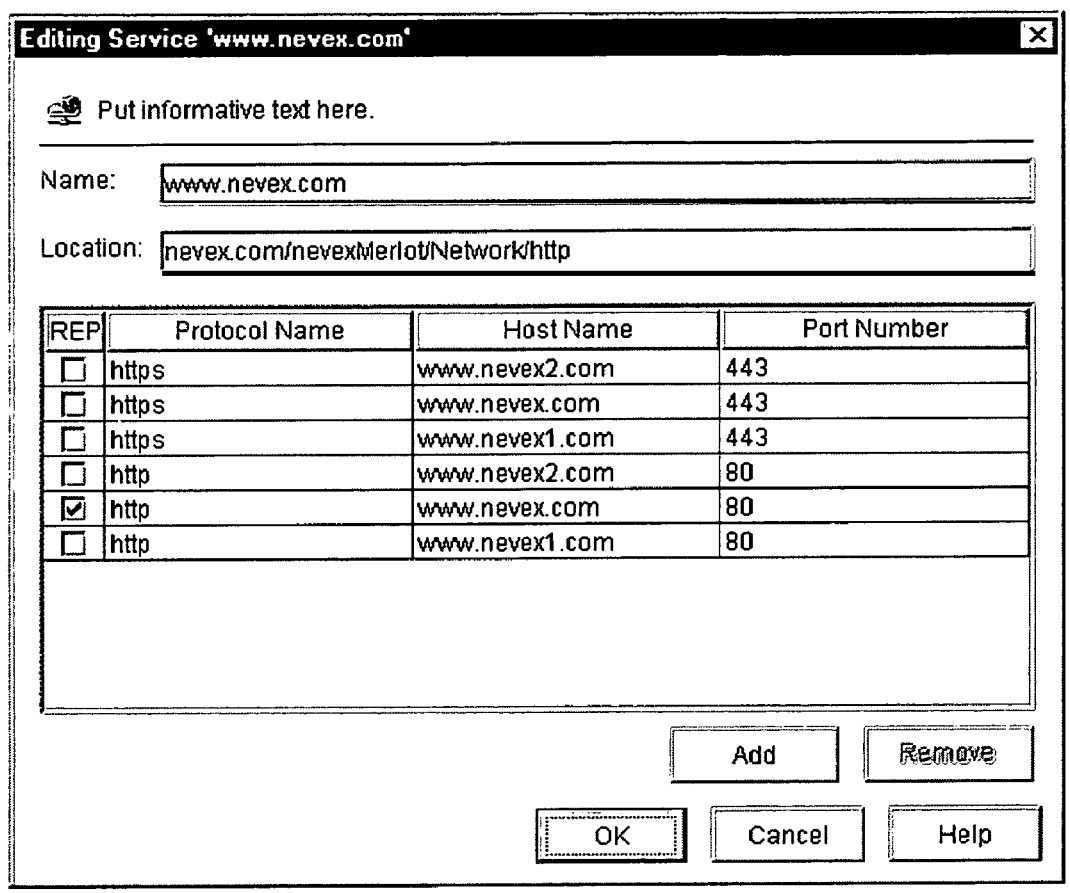
FIG. 7 is a representation of a screen shot showing example service entry data for the security service of the preferred embodiment.

An example of data in a service entry is seen in FIG. 7. FIG. 7 shows a screenshot of a window used to define service entry data. In the example, a Web farm having three different web servers all providing the same content to Internet users is represented by a single server entry in the resource tree under the name www.nevex.com, corresponding to service entry 124 shown in FIG. 6. In the example of FIG. 7, the machines also provide the same data over SSL using the HTTPS protocol and port.

The folders and services in the resource tree of FIG. 6 can either be built manually using the interface provided by the security service (as in FIG. 5) or a network discovery component of the preferred embodiment security service can be used to add network services to the resource tree using a standard folder service layout defined by the preferred embodiment. In this standard layout, a folder is generated for each protocol and each machine providing that service is added as a new service under that protocol folder forming a tree. Once a given service is added, no additional folders or service entries can be added underneath that service. The policy manager must assume that only resources being provided by that given service are added to the resource tree under that service entry.

There are two ways to add resources to the resource tree. The first way is manually. The policy manager enters the resources for a given service entry in the resource tree using the interface provided by the policy builder. Resources can be nested. In such a case, the interface of the policy builder automatically changes the icons to show that the upper level resource is a group of resources.

An example is illustrated in FIG. 6 with respect to an ftp server. A typical ftp server is organized into directories which may contain other directories or files. In the security service, an analogous structure may be used to represent the ftp service in the resource tree. The top-level resource under the service would be the top-level directory of the ftp server. In the resource diagram shown in FIG. 6, "Public FTP Server" 112 has three directories "bin", "etc" and "pub", 114, 116, 118, respectively. Pub entry 118 contains a document shown as "Readme" entry 120 and a directory shown as "src" entry 122.

The resource data for the resource tree data structure can also be added to the system automatically using a resource discovery. As part of the resource discovery, the security service can execute a plug-in (one for each resource). The plug-in enumerates the structure and contents of the service and passes that information back to the policy builder. The policy builder passes the data to the LDAP server for storage for the resource tree. For example, Web server data may be discovered by running a commercially available web "spider" for a particular web server to obtain a list of all HTML pages accessible from the root of the server. The plug-in sends its results back to the policy builder to store the resources discovered in the directory server for presentation to the policy manager.

Because the resource tree data structure is stored in the LDAP server in the preferred embodiment, the data may be manipulated like any other data conforming to the LDAP protocol. For this reason, there are different mechanisms available to add data to the LDAP server (allowing manual population of the resource tree).

Once the data representing network services and resources has been added to the LDAP server, the policy builder is able to read the data from the LDAP server and present it to the policy manager using the GUI shown in the example of FIG. 5.

In the preferred embodiment, with reference to the FIG. 1 example, the values that are enumerated and stored in LDAP 30 server must be the same as the values that are presented to validators 22, 24 by the respective APIs in servers 18, 20. This is a requirement to permit validators 22, 24 to find the correct policy rule for specific resources in the directory server.

The resource discovery function of the policy builder is implemented by plug-ins that interrogate the network and return data about the network resources. The steps carried out to implement this aspect of the policy builder component are as follows:

1. The policy manager maps a command line call to each available service (to run programs which provide data about the services);
2. The command line call can include special arguments that direct the policy builder to supply the name of the service, the host, and the port as parameters to the program to call;
3. The program runs, gathers the data, and passes it back to the policy builder;
4. The policy builder then reads the data, sorts it and stores it in the LDAP server as well as displays it to the policy manager (using the GUI as shown in FIG. 5).

As indicated above, the policy builder also permits the policy manager to define a business relationship tree data structure. It will be appreciated that an existing LDAP directory may also contain a business relationship tree data structure for a particular network. In this case, the security service will be able to make use of the existing data regarding users. The policy manager may modify or add to existing user data stored in an LDAP-compliant format, or the policy manager may create a new data structure, depending on the pre-existing user data for the network and depending on the requirements for security definition for the network. It will be appreciated by those skilled in the art that automated user discovery can also be added to the security service in a manner similar to that described for automated service and resource discovery.

The security service allows a policy manager to provide policies on existing sets of users without requiring replication of data describing those users already maintained in the computer system. Where a given LDAP directory stores data unrelated to the users of interest to the policy manager, the policy manager may locate, using the policy builder component, users in the LDAP directory by defining a subtree in the LDAP directory. The policy builder (GUI) then uses the structure found at that location in the LDAP directory as its business relationship tree (this business relationship tree may be modified later by the policy manager using the policy builder interface).

The business relationship tree reflects the relationships a policy manager wishes to differentiate by using different policy decisions. Typically, relationships will be either external relationships or internal groups. For example, a company using the security service for security of its external relationships might have a business relationship tree as in the screen shot of an example business relationship tree shown in FIG. 8.

Figure 8:
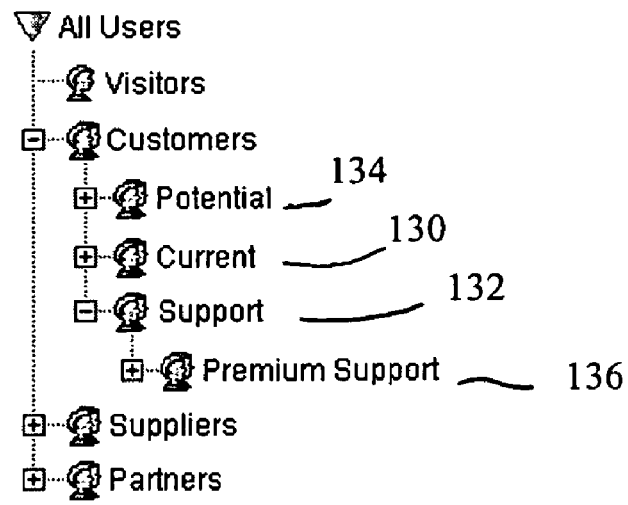
FIGS. 8 and 9 are representations of example business relationship trees as displayed by the preferred embodiment.

By its hierarchical nature, the tree structure shown in FIG. 8 facilitates the definition of identical permissions for users grouped under current customers (under entry 130) and under support customers (under entry 132), but different rules applying to users depending on whether the user is grouped under current customer entry 130 or potential customer entry 134. Similarly, a user defined to be a customer with a premium level of support (and therefore grouped under entry 136) may be provided with a different level of access to corporate resources than other users.

Figure 9:

A company using the security service on its internal network might have a breakout as set out in the example screen shot of FIG. 9. Using this example business relationship tree, access to R&D resources on the network may easily be restricted to users grouped under Development entry 140 and the corporate accounting information may be restricted to users grouped under Finance entry 142. Assigning individual policies to a member of a group or developing sub-groups, can create further levels of permission.

There is no need to limit the business relationship tree to an external or internal implementation. The data structure may support both types of relationships. Therefore, a single implementation can have both external business relationships and internal company divisions at the same time.

In the security service of the preferred embodiment, entries in the business relationship tree data structure may represent either users or groups of users. The preferred embodiment supports groups of users corresponding to both LDAP organizational units and LDAP groups of unique names. The two types of groups are represented graphically in the security system as different icons in the business relationship tree display. A folder is used to represent the LDAP tree branch points, for example the "People" folder (corresponding to an LDAP organizational unit) in the business relationship tree displayed in FIG. 5. This folder icon differs from the icon for "Marketing" which corresponds to the LDAP group of unique names which in the LDAP directory often does not have information under it in the hierarchy. The hierarchical structure of the business relationship tree is constrained such that group entries in the tree may have children but user entries may not have children entries. It will be apparent from the example of FIG. 5 that while the LDAP group of unique names structure does not strictly have children, in the security service of the preferred embodiment treats the member users in such a node in the tree as being subnodes. The structure of the business relationship tree is such that a single user may have different entries in the tree. This will occur where a user belongs to different groups in the organization. In the preferred embodiment, all entries for a given user will have the same access policy. This policy will be computed from the inheritance of all the groups to which that user belongs and from any policies placed directly upon that user (as described in the inheritance rules below). The groups in a business relationship tree are a benefit in defining access policies as they permit a single policy to be defined that will apply to all members of the group (as described below). Each user in the security system of the preferred embodiment is identified in the system by matching the user to a particular user entry in the business relationship tree. Users are not directly identified by the security service by group membership.

Turning now to the access policies themselves, as indicated above, the policy builder component of the security service allows the user to make access policies for each user entry in a business relationship tree for the services and resources in the resource tree. The policy manager uses the GUI of the policy builder to set policies at the intersection points or nodes of the grid (shown in section 94 of FIG. 5). Using the policy builder GUI of the preferred embodiment, the policy manager sets a security policy for a particular node in the grid. The policy manager selects desired policy provided by the security system (for example allow or deny) or, as required, creates a new policy.

The scalability of the security service is enabled by the use of double inheritance of policies. The policy at a node in the grid determines the access that the user or group in the column containing the node has to the resource in the row containing the node. In FIG. 5 access allowed is shown as a check, derived as a cross and a defined policy rule. If the service or resource corresponding to the node has items under it in the resource tree, then all items under it inherit the same policy (unless overridden with a specific policy). If the user in the node's column has users under it in the business relationship tree (i.e. a policy was set for a group) then all such users also inherit that policy for that service or resource. If a user has two or more different policies because of inheritance from multiple groups then the user inherits the union of the policies. The union of policies is defined such that if any single policy that a user inherits from gives an "allow" then the user can have access to the desired service or resource. The policy manager may change the multiple group inheritance from a union of all policies to an intersection of the policies. In that case, the user is only given an "allow" permission if all users it is inheriting from give an "allow" permission.

The two-way inheritance scheme makes the security service highly scalable. New services and resources can be added to the resource tree and may be automatically covered by access policies inherited from definitions in the resource tree above them. Security policies can be set on large subtrees of a given resource with a single definition. This eliminates the need to set a policy on every item in the resource tree, which is important for large organizations.

The nodes that are expressly defined by the policy manager are, in the preferred embodiment, distinguished from nodes which are defined by the inheritance function of the interface (in the preferred embodiment, the expressly defined nodes are shown with a different colour for the icon).

The policy builder allows policy managers to define powerful access policies. Once defined, these policies authorize access to each available resource. Simple "allow" or "deny" rules can be set up on any given resource. More powerful policies can be based on decision trees where "yes" and "no" paths are defined. These paradigms make assigning a policy to users and groups of users across multiple services scalable. In addition, the policy builder component may be extended to support policy decisions that are defined for a particular user or group of users.

There are three different ways that the policy manager is able to use the security service of the preferred embodiment to define specific simple or conditional policies:

1. The policy builder component permits (by way of the GUI, described below) a policy manager to combine conditional nodes implemented in the security service to define a required conditional rule;
2. The policy manager may define a new conditional rule by creating a Java plug-in that is stored in the LDAP server as a Java class; and
3. The policy manager may define a policy using the XML attribute rule provided by the security service.

Figure 10:
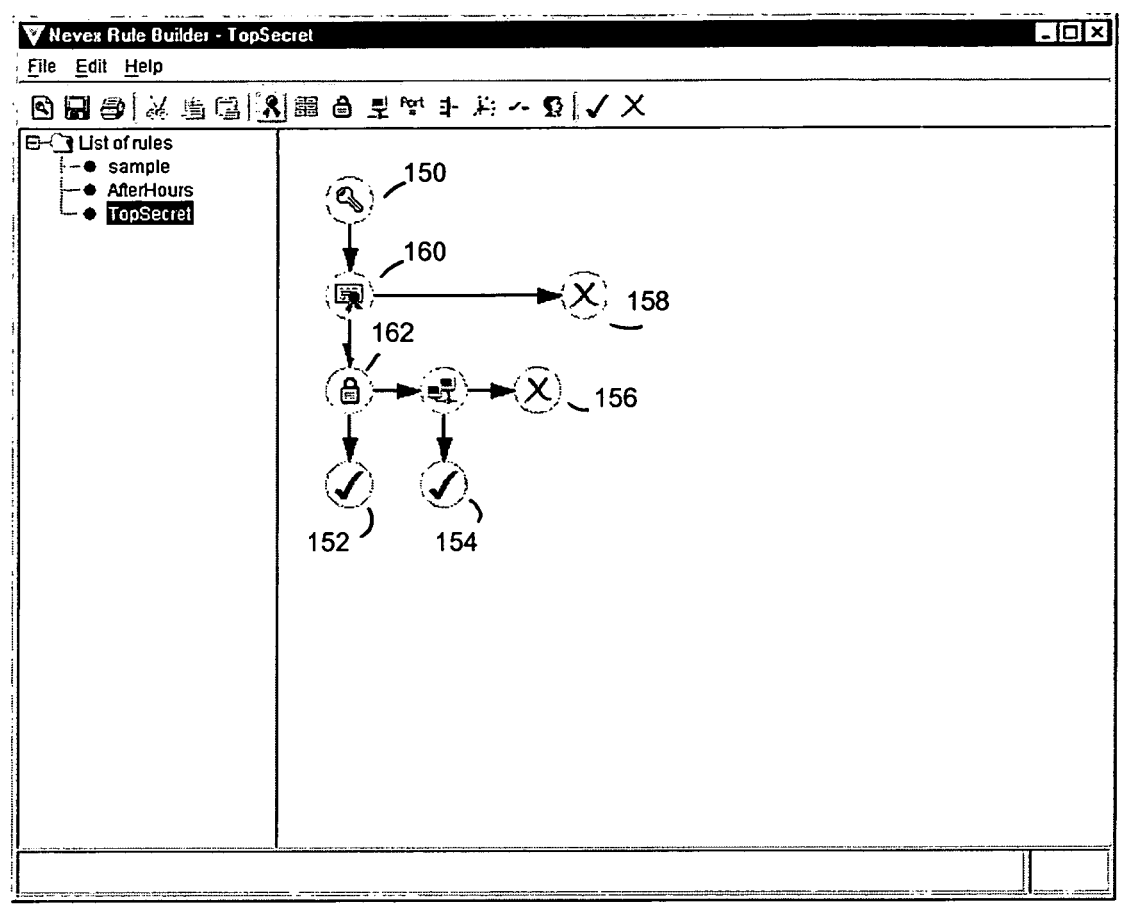
FIG. 10 is a representation of a screen shot showing an example display of a visual editor for a decision tree implemented by the security service of the preferred embodiment.

Turning to the first manner of defining a policy, the policy manager is provided with a visual decision tree editor to create and manipulate a graphical representation of a defined policy (a "conditional rule"). The decision tree editor allows the policy manager to construct sophisticated security policies from conditional nodes provided by the security service of the preferred embodiment. FIG. 10 is a screen shot showing a sample decision tree as displayed by the visual editor of the preferred embodiment.

In FIG. 10 node 150 is the root node for the conditional rule defined by the decision tree. Nodes 152, 154, are terminal nodes that each indicate a result allowing access to a service or resource. Nodes 156, 158 are nodes that each indicate a result which denies access to a service or resource. The graphical representation of the policy is defined such that a vertical downward arrow represents the condition defined in a conditional node being met and a horizontal arrow to the right indicates the condition is not met. For example, node 160 may contain a requirement that a user provide a security certificate. If the certificate is provided, the downwards arrow is followed to node 162. Other nodes can be chained on both the true path and false path to allow multi-step decisions about access.

The security service of the preferred embodiment includes an initial set of conditional nodes that can be combined by the policy manager in any order to form conditional rules. The conditional nodes included in the security service are nodes that permit the policy manager to define access based on: day of the week, time of day, host addresses, ip address/host name/domain name, authentication, protocol and encryption level. Although the preferred embodiment is defined to include the above simple access rules, other implementations may extend or modify this set.

As referred to above, there is a second method of defining policy rules. The policy manager is able to define plug-ins using Java language classes, to be stored in the LDAP server. The policy builder permits the defined Java plug-ins to extend the pre-defined conditional nodes. In the security service of the preferred embodiment, the ability to extend conditional nodes is available only for the authentication node and the level of encryption node. As will be apparent to those skilled in the art, the object-oriented framework of the preferred embodiment implementing the security service may permit other conditional nodes to be extended by Java classes defined as described above. The authentication and level of encryption conditional nodes are particularly suited to being extended by the policy manager, however, due to the different customization requirements which are likely to be encountered in different applications of the security service.

With respect to the authentication node, the security service of the preferred embodiment provides three methods of authentication: registration, passwords and X.509 certificates. By updating the list of authentication servers in the LDAP directory, policy managers can extend the system's support for new authentication methods. New servers can implement different desired authentication methods.

The third way to extend policy rule functionality is using the XML attribute node provided by the security service (represented by an XML attribute node in the decision tree of the policy builder GUI). This allows the policy manager to stipulate a set of attribute, value pairs that must be present in the data that is passed to the validator by the resource in the policy query object. A table contains the node's properties. The table has two columns: "attribute name" and "attribute value". The output of the configuration of this node is a policy definition object that contains a list with the two values as pairs. When it sees this rule, the validator takes the policy query object it received from the application server and checks to see if each attribute is present. If so, the validator checks to see if the values match the values in the rule. If both of these are true, then the "yes" path is taken; otherwise the "no" path is taken.

An example of a possible XML attribute node for the HTTP protocol is set out as follows. In the HTTP protocol, operations of type "get", "post", and "head" are all possible. If the policy manager seeks to limit all access to "get" only and if the policy manager requires support for V1.1 of the protocol, then the policy manager could set up an XML attribute node for HTTP, as shown in the table of Example 3. The result is that the validator will carry out the following when a user attempts to view the resource:

1. Retrieve the policy definition object from the directory server;
2. Note the attribute node in the policy for this resource and check to see if there is an "Operation" attribute in the policy query object received from the API of the security service;
3. If there is not an "Operation" attribute in the policy query object, it returns false for this simple rule. If there is an operation attribute, then this rule is true (but the rest of the attributes must also be considered);
4. Check to see if there is a "Version" attribute in the policy query object;
5. If there is no "Version" attribute, then this rule in the tree evaluates to false (even if the "Operation" attribute was true). If there is a "Version" attribute and if it has the value "V1.1", then this whole rule evaluates to true otherwise it evaluates to false.

| Attribute name | Attribute Value |
|---|---|
| Operation | Get |
| Version | V1.1 |

Example 3

In summary, for the node shown in the table of Example 3, the rule evaluates to "true" for HTTP V1.1 operations of type "get" and false for "post", "head" or any other HTTP operation.

As will be understood by those skilled in the art, the application server, or in this case the Web plug-in, passes the HTTP operation type and the HTTP version to the validator via the appropriate API.

The security service allows defined sets of users to be policy managers for defined resources and users. The security service supports distributed administration of the security service. Policy managers (such as those shown as 14, 16 in the example of FIG. 1) are capable of being granted different permissions for different parts of the user and resource space. In this manner, "group" policy managers may be created for a given security service. These "group" policy managers will be able to set a policy for the group of users assigned to them. For example, if a company has a supplier that has many users, that company can designate a policy manager at the supplier to maintain the user policy for the supplier's employees. In such a case, a specified set of services and resources will be available to the supplier's policy manager and the policy manager will be constrained by the security system to only "see" the users at the supplier when defining authorization and access to the specified set of services and resources at the company's network.

As indicated above, the policy builder plug-in mechanism allows seamless integration of new policies into the security service. This allows OEMs, contractors, and end-users to develop their own decision nodes in the decision tree. The policy builder plug-ins are implemented in the object-oriented framework of the preferred embodiment in the following steps:

1. The Java code for the properties screen is generated using a suitable Java programming kit.
2. The end result of the development is a class file (or files) containing all the code which conforms to the policy builder's API (as defined in the security service).
3. An entry in the LDAP directory is created with one attribute set as the actual Java code and another set as a combination of the package name and class name.
4. Icons are also stored in the directory server: one per access rule node.
5. The "dn" ("distinguished name") of the directory server entry for the Java plug-in, for the class name1/name2/ . . . is of the form: "package=name1, package=name2, . . . " which mirrors a standard LDAP dn.
6. On startup, the policy manager reads all the classes and uses the package information to instantiate the class in the correct Java package.

This method of implementing plug-ins for the policy manager avoids the need to store information on the user's desktop. It is possible to run the policy builder from any desktop and obtain access to all current plugs-ins.

As the above description of the policy builder component of the security service indicates, policy managers are able to use the security service to define access policies for services, resources and users. They are able to extend the object-oriented framework implementing the security service to both obtain information about the network in a specified manner, and to define rules for access, both by using plug-ins which are integrated into the security service.

Turning now to the validator component of the security service, the validator determines if user access is allowed to a particular service or resource by evaluating the appropriate security policy stored in the LDAP server.

In the operation of the security service, the validator receives a query from the security service API running on a resource server. This query is called a policy query object. The validator uses the LDAP server data to find the policy corresponding to the user and service or resource being accessed. There may not be an expressly defined policy for the user resource combination. In that case, the validator uses the inheritance rules (described in general, above) to determine which policy to use. The inheritance rules followed by the validator are as follows:

1. For the given user, look up the resource in the resource tree to see if a specific rule was expressly defined for that user for the desired resource. Use the expressly defined policy, if available. If not, use the first policy expressly defined for that user found in the resource tree by traversing the resource-tree upwards.
2. If no expressly defined rule is found for that user then look in the groups to which the user belongs as defined in the business relationship tree. For each group, the validator starts at the resource itself and traverses up the resource tree. For each rule that applies to a group that the user is a member of, the validator evaluates the rule and if the access is allowed, then access to the resource is granted. If access is denied, then the validator continues evaluating group policies, until either access is allowed or there are no further rules that are found. In the latter case, access is denied to the user.

It will be appreciated by those skilled in the art that different mechanisms may be used to implement the grid data structure. In the preferred embodiment, the grid is maintained as a sparse matrix. The values stored in the LDAP server are only those nodes expressly defined by the policy builder. As is described, the security service provides for inheritance in the grid. By maintaining only the expressly defined nodes in the grid, the system will require fewer system resources to store the data structure. However, the validator, and the policy builder, each expands the sparse matrix representation of the grid where a node in the grid is being evaluated or displayed and that node is not expressly defined. In such a case, the inheritance rules of the preferred embodiment will be used to determine the value of the node.

With respect to the representation of the grid, in the preferred embodiment, the validator retrieves the policy definition objects from the grid stored in the LDAP server as a set of nodes in the grid, rather than the entire grid. For a request relating to a given service or resource, the validator will retrieve the set of nodes in the grid corresponding to the service and resource and all services and resources under it in the resource tree, and corresponding to the columns for each of the defined users, the non-interactive authentication column, and the unknown user column (as described below). This approach results in a potentially relevant set of nodes being available in the cache of the validator for the service or resource. These nodes may be used to respond to future requests. This will result in efficiencies where a given service or resource is sought by multiple users or repeatedly by the same set of users.

Once the validator has the applicable policy definition object, it valuates the policy tree that the object contains. In the case that there is no policy definition object defined for a user and service or resource pair, then the validator returns a "deny" access decision. The validator returns back to the calling resource server when a terminal node (for example an "allow" or "deny" node) is encountered. The application must then enforce the validator's decision by allowing or denying access to the resource Each policy definition object contains an XML description of a complete decision tree. for the policy. Therefore all of the nodes, decision paths and policy manager defined plug-ins are contained in the object retrieved stored in the LDAP server. For each node in the decision tree, there is a reference in the XML to a plug-in called by the validator to allow it to evaluate that node. As it traverses the decision tree, the validator parses the XML and calls the associated plug-in to evaluate each node it encounters. The security service defined conditional nodes are defined by plug-ins. In this way, the validator is completely generic. It receives the policy query object from the API for the service or resource, retrieves the policy definition object from the LDAP server and calls the policy decision plug-ins for the required nodes (both those defined by the system and by the policy manager).

The security service provides for policy decision plug-ins to be defined by a system administrator or policy manager. The policy decision plug-ins allow the policy manager to modify how policy decisions are made for existing conditional nodes in the grid or to create new evaluation rules for the validator. These plug-ins typically correspond to the policy builder plug-ins described above. A policy builder plug-in defines a custom-designed decision node will require a new policy plug-in for use by the validator when that decision node is encountered.

In the security service of the preferred embodiment, the location of plug-ins for the validator is on the machine that is running the validator itself. It is understood by those skilled in the art that the LDAP server may also be used to store plug-ins for the validator and that distributed protocols such as COM and CORBA can also be used to handle the plug-in functionality required for the validator.

The policy decision plugs-ins for the validator are implemented in the following steps:

1. The administrator or policy manager creates a shared library (.so on Unix or dll on Windows), which contains C++ callable routines, using the specified API;
2. The validator is configured to look in the specified directory for plug-ins, read all the shared libraries in that directory and call the initialization routine for each library;
3. Each node in the policy tree requires for a policy definition object a corresponding "decider" in the validator. To create the deciders, the validator calls the initialization routine of each shared library and those routines register each decider contained in their libraries with the validator. The registration consists of adding an entry for each decider contained in the library to a table maintained in the validator. The entry consists of the name of the node and the plug-in to call, to implement the evaluation defined by the node.
4. When the validator needs a particular decider for a node that it wants to evaluate it invokes the plug-in by, instantiating the appropriate node decider and passing the appropriate XML information to the decider for evaluation.
5. The decider returns to the validator the results from this node. The validator goes on to the next node in the decision tree or returns a final decision to the service or resource, as appropriate.

Turning to the authentication function of the security service, the preferred embodiment illustrates how this may be customized as well. The authentication of a user may take place by a policy including a security service-defined authentication decision node. Such a node allows the policy manager to choose an authentication server to use to authenticate the user. Each authentication node in the preferred embodiment includes an ordered list of servers. The security service of the preferred embodiment supports registration, password and X.509 servers. However, others may be added. To add an authentication server to the security service, an authentication decider is needed for each authentication type. Authentication deciders are made available to the validator in the same way that other deciders are added. For the policy builder (i.e. the user interface), a policy builder plug-in provides a Java configuration screen for that authentication method. When the policy manager selects a type of server to configure, then the correct configuration screen is given. The results of the configuration are provided in XML format, which tells the decider how to authenticate the user. In this way the authentication subsystem supports different types of authentication mechanisms such as: biometric, challenge/response, PKI, and password.

Thus when the validator encounters an authentication node, the decider for that type of authentication (PKI or password for example) takes the server configuration XML and performs the authentication. Currently there are two mechanisms that authentication can use to query the user. One is to use the service itself to carry out the authentication. In that case the user is queried as part of the service interface and the information obtained from the user is used to verify the identification of the user. An example of this is where a web server presents a "login" page.

The other mechanism is to use the desktop client for authentication. In the preferred embodiment security service the desktop client will only support X.509 digital certificates and password but an ability to add other mechanisms via a plug-in architecture is available given the architecture of the preferred embodiment.

The security service of the preferred embodiment supports non-interactive authentication. In many circumstances, the policy manager for a given network will wish to configure the security service to authenticate a user without requiring the user to interact with the security service. This non-interactive authentication may be done by a number of different mechanisms. In the security service, non-interactive authentication is defined based on services and resources.

Whether or not a particular service or resource is characterized by non-interactive authentication is specified in a "non-interactive authentication" column in the policy builder grid. As will be appreciated, the non-interactive authentication characteristic may be represented in a manner other than as a column in the policy builder grid. There are however, advantages to including the non-interactive authentication characteristic of a service or resource as a column in the policy builder grid.

In the non-interactive authentication column of the policy builder grid, the policy manager is able to specify an authentication plug-in to be used to authenticate a user seeking access to a service or a resource. To properly use this column, the policy manager may only specify authentication plug-ins which authenticate the user without being queried. Such authentication plug-ins permit information to be gathered automatically (because it has been passed in by the service with the query or because the desktop authenticator can supply the information without querying the user). Where the policy manager does not specify an authentication plug-in in this column, the security service will not seek to authenticate the user.

The validator looks at the non-interactive authentication entry for a given resource and tries to determine the identity of the user seeking to access the data according to that entry. The authentication is done without interaction in that the user is not queried directly but if the information is available from either the desktop or from the policy query object it will be used to determine the user information. This user information is used to determine where on the grid to find the policy for the desired resource. If the user is not known, then the policy for the "unknown user" will be used.

If the validator during its evaluation of an access policy queries a user to authenticate the uses, then if the authentication is successful the validator will start again and use that new user identification to determine the policy to use for access to the resource.

The validator also acts as the broker for authentication. When an authentication node is encountered in the decision tree for a policy, the validator will either, using a desktop plug-in, query the user to authenticate the user or solicit authentication information from the resource itself via the API. If multiple authentication methods are required, then the validator can query a user multiple times until all authentication methods required have succeeded.

In order to provide a "single sign-on" access, the validator is able to pass back a "cookie" to a resource. This cookie has all of the collected credentials provided for this user. On subsequent calls to the resource for this user, the validator will use information encoded in the cookie without requiring further authentication. To prevent tampering and forgeries, it is important to note that in the preferred embodiment all cookie information is encrypted and authenticated using PKI.

The desktop client gets authentication information from the user and where possible saves it for a specified length of time only. This client can then answer authentication queries from the validator on behalf of the user until a timeout is reached. The desktop client can also popup a window asking the user to enter authentication information if the last entered information has expired or if a different kind of authentication information is needed.

In more detail, the desktop client works as follows:
1. The user provides credentials for authentication to the desktop client. This is done by having the client automatically start up when the user logs on or by the user expressly running the client. In either case, the client queries the user for credentials, optionally calls the authentication server to validate the credentials, and stores the credentials for use when queried by the validator. The interaction with the authentication server may be via a plug-in stored in the LDAP server or may be built in to the desktop application itself. The credentials may include a password, an X.509 certificate, a finger print scan, or another supported authentication technique.
2. Once the optional validation of the credentials is complete, the desktop client stores these credentials internally for a specified length of time (this is settable).
3. During the time period the credentials are stored, the desktop client may respond to all queries from the authentication plug-ins without querying the user. Some authentication techniques may always require the user to interact with the client. Also, some security measures may require that each access is interactively authenticated and that stored information is not allowed to be used.
4. When the credentials expire, the user must re-authenticate to the client to have continued access to authentication protected resources.

The desktop client itself is written in Java and it has a plug-in architecture that allows new authentication mechanisms to be added to the client via an exposed API. The plug-in Java classes may be stored on the desktop itself or they may be downloaded from the LDAP server.

The object-oriented framework for the security service and the associated plug-ins, described above, permit the administrator or policy manager to manage the network policy for different services using customizable decision criteria. The plug-in nature of the product allows the policy manager (or other administrator) to modify the behaviour of the product in a desired manner while providing a sophisticated graphical tool to allow for the configuration of numerous detailed network policies.

Figure 11:
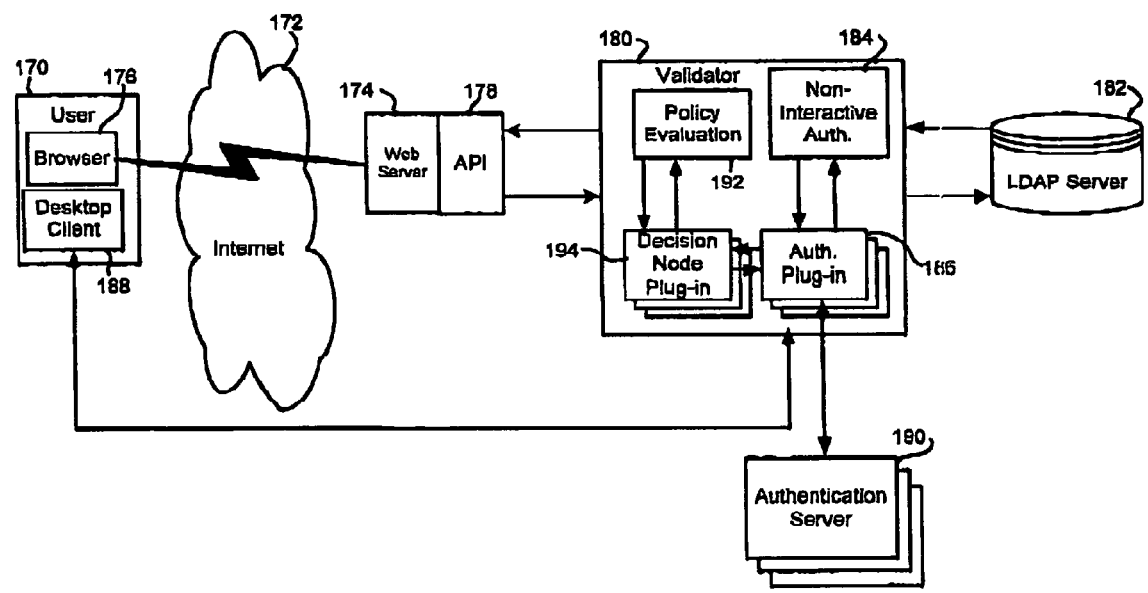
FIG. 11 is a schematic diagram showing an example of user access and security service authentication and access control according to the security service of the preferred embodiment.

FIG. 11 illustrates how an example security service constructed using the framework of the preferred embodiment responds to a request from a computer shown as user 170, using internet 172, for a resource on web server 174:

1. User 170 uses browser 176 to look at a desired URL corresponding to a page on web server 174.
2. Web server 174 invokes a plug-in to check for access to the requested URL. The Plug-in for web server 174 uses security service API 178 to pass a policy query to validator 180 to determine if the access is allowed.
3. Validator 180 passes an LDAP query to LDAP server 182 to determine the policy for the requested access (alternatively, the validator retrieves the policy from its cache, not shown).
4. Validator 180 receives the XML Policy from LDAP server 182 (alternatively the cache).
5. Validator 180 parses the XML Policy corresponding to the non-interactive authentication column of the grid to determine if policy specifies that the identity of the user trying to make the access must be determined. If so, validator 180 (shown as non-interactive authentication component 184) calls the appropriate authentication plug-in 186 as defined by the configuration of the non-interactive authentication entry for this resource. For all authentication generated by the non-interactive authentication column, the plug-ins defined will use non-interactive authentication.
6. If the configuration of the non-interactive authentication entry for this resource specifies a query the user's desktop client for credentials or authentication information then any such credentials are determined from desktop client 188.
7. Validator 180 calls the appropriate authentication server 190 to authenticate the user, based on the credentials supplied.
8. Authentication plug-in 186 returns any credentials, confirmed by authentication server 190 to the validator's non-interactive authentication section 184.
9. The credentials returned from the authentication plug-in 186 are used by validator 180 to evaluate the policy for this user, as shown in policy evaluation component 192 in validator 180. The credentials specify which user in the XML policy to use (corresponding to a defined user in the grid). The appropriately defined decision node plug-in 194 will be invoked by policy evaluation component 192. If no identification information was returned from the non-interactive authentication step, or if the user authenticated is not in the given business relationship tree, then validator 180 uses the "unknown" user column of the grid represented in the XML Policy retrieved from the LDAP server.
10. If a given node in the grid represented in the XML Policy is an authentication node, validator 180 performs authentication by decision plug-in 194 calling the appropriately defined authentication plug-in 186 specified by the node. Unlike the non-interactive authentication described above, for authentication generated by an authentication node in a security policy rule (the grid) the authentication may be interactive. If needed, desktop client 188 (or authentication plug-in 186) will query the user directly to determine the authentication information or credentials.
11. The credentials retrieved, if there are any, are sent to authentication server 190 to be verified.
12. The results of the authentication by authentication server 190 are returned to decision node plug-in 194, by way of authentication plug-in 186.
13. If the node in the grid represented in the XML Policy being evaluated is not an authentication node, policy evaluation component 192 invokes the appropriate plug-in for that node (as shown in FIG. 11, plug-in 194). Plug-in 194 evaluates the node and returns the result to validator 180, and specifically to policy evaluator component 192.
14. Policy evaluation component may repeatedly call decision node plug-ins (represented by decision node plug-in 194 in FIG. 11), as required by the XML Policy retrieved from LDAP server 182. This process will continue until the policy has been completely evaluated.
15. The results of the evaluation will be returned to API 178 and either the plug-in or the server itself enforces the decision. It is possible that for some configurations, the plug-in invoked by web server 174 will gather more information from the user (for example a user name and password) and then relaunch the query.

As may be seen from the above example, once the authentication and access policies are defined, the architecture of the object-oriented framework of the preferred embodiment permits the authentication and access control steps to be carried out in similar manner for different policy queries. The use of the validator to parse the XML policy definitions found in the LDAP server, and the use of plug-ins to define specific authentication and access policies, permit a single approach to validation to be tailored to the requirements of diverse computer networks.

Although a preferred embodiment of the present invention has been described here in detail, it will be appreciated by those skilled in the art, that variations may be made thereto, without departing from the spirit of the invention or the scope of the appended claims.

We claim:

1. A computer security service for a computer network accessible by users and comprising services and resources, the computer security service comprising,
    a policy builder component, comprising
    a network constituent definition component, for defining user data and services and resources data corresponding to the computer network users, services and resources, and
    a policy definition component for defining access policies for the computer network users, services and resources, wherein the policy definition component comprises a policy definition plug-in integration component for registering one or more policy definition plug-in components for use in defining the access policies,
    a database component for maintaining user, services and resources data, and access policies, and for providing a set of selected access policies in response to a database query, and
    a validator component, comprising
    a request parser for receiving a policy query for service or resource access originated by a network user and for generating a corresponding database query for submission to the database component, and
    a policy parser for receiving the set of access policies provided by the database component in response to the corresponding database query and for generating a policy decision for communication to the network user based on the set of access policies provided by the database component.

2. The security service of claim 1 further comprising an API component for receiving an access request for service or resource access originated by a network user and for passing a corresponding policy query to the validator component, the API component further receiving the policy decision from the validator and accordingly permitting or denying access to the network user.

3. The security service of claim 1 in which the database component maintains the user, services and resources data, and the access policies in an LDAP compliant format.

4. The security service of claim 1 in which the validator component comprises an authenticator component for authenticating one or more of the network users.

5. The security service of claim 4 in which the authenticator component comprises an authenticator plug-in integration component for registering plug-ins used in the authentication of the network user.

6. The security service of claim 4 in which the authenticator component comprises a non-interactive authentication component for the authentication of one or more network users without requiring the one or more network users to interact with the security service.

7. The security service of claim 4 further comprising a desktop component for installation on the computer of a network user for use in the authentication of the user.

8. The security service of claim 1 in which the access policies are stored as XML documents and in which the validator component comprises an XML parser.

9. The security service of claim 1 in which the policy builder component comprises a graphical user interface for displaying
a grid having nodes, laid out on a first and on a second axis,
user labels corresponding to the user data, each user label labelling nodes aligned relative to the first axis of the grid, and
resource labels corresponding to the services and resources data, each resource label labelling nodes aligned relative to the second axis of the grid,
the nodes in the grid corresponding to the access policies for users and services and resources, as defined by the user and resource labels.

10. The security service of claim 9, in which the grid comprises a defined set of nodes, aligned relative to the first axis of the grid, each of the defined set of nodes representing the non-interactive authentication characteristic for a unique one of the defined services and resources displayed in the grid.

11. The security service of claim 9, in which the grid comprises a defined set of nodes, aligned relative to the first axis of the grid, each of the defined set of nodes representing the access policy for an unknown user for a unique one of the defined services and resources displayed in the grid.

12. The security service of claim 9, further comprising an access policy editor for defining the nodes in the grid, the access policy editor comprising means for graphically assembling icons representing policy rules to define an access policy for a user-specified node.

13. The security service of claim 1 in which the network constituent definition component further comprises a resource discovery component to poll the computer network and to generate a resource tree data structure corresponding to resources in the computer network.

14. The security service of claim 13, in which the resource discovery component further comprises a resource discovery plug-in specification component to specify resource discovery plug-in components for carrying out the process of discovery of the resources for a defined service in the network.

15. The security service of claim 1 in which the network constituent definition component further comprises a user discovery component to poll the computer network and to generate a business relationship tree data structure corresponding to users defined for the computer network.

16. A policy builder for a security service of a computer network accessible by users and comprising services and resources, the policy builder comprising,
a network constituent definition component, for defining user data and services and resources data corresponding to the computer network users, services and resources, and
a policy definition component for defining access policies for the computer network users, services and resources, the policy definition component comprising,
a plug-in integration component to permit a policy manager to register one or more plug-in components for use in defining manager-defined access policies,
a defined access rule component for providing a set of pre-defined access rules to a policy manager for use in creating access policies.

17. The policy builder of claim 16 further comprising an access policy editor for defining the access policies, the access policy editor comprising means for graphically assembling icons representing the pre-defined access rules and manager-defined access policies.

18. A method for providing computer network security, the network being accessible by users and comprising services and resources, the method comprising the steps of:
using a policy builder to define user data and services and resources data corresponding to the computer network users, services and resources, and to define access policies for the computer network users, services and resources,
registering one or more policy definition plug-in components for use in defining the access policies,
maintaining user, services and resources data, and access policies, in a database,
providing a set of selected access policies in response to a database query,
receiving, in a validator, a policy query for service or resource access originated by a network user and generating a corresponding database query for submission to the database component, and
receiving, in a validator, the set of access policies provided by the database component in response to the corresponding database query and generating a policy decision for communication to the network user based on the set of access policies provided by the database component.

19. The method of claim 18 further comprising the steps of:
displaying, on a computer display unit, a grid having nodes, laid out on a first and on a second axis,
displaying, on the grid, unit user labels corresponding to the user data, each user label labelling nodes aligned relative to the first axis of the grid, and
displaying on the grid, resource labels corresponding to the services and resources data, each resource label labelling nodes aligned relative to the second axis of the grid,
whereby the nodes in the grid correspond to the access policies for users and services and resources, as defined by the user and resource labels.

* * * * *